Figure 8:
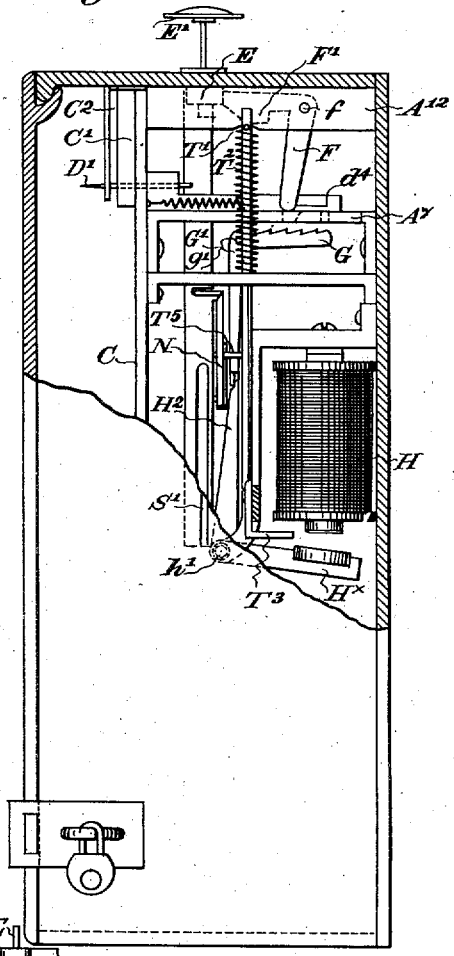

No. 12,015. Reissued July 22, 1902.
J. B. GILL.
TOLL COLLECTING AND CALL RECORDING DEVICE FOR TELEPHONE SYSTEMS.
(Application filed Sept. 6, 1900.)
2 Sheets—Sheet 1.
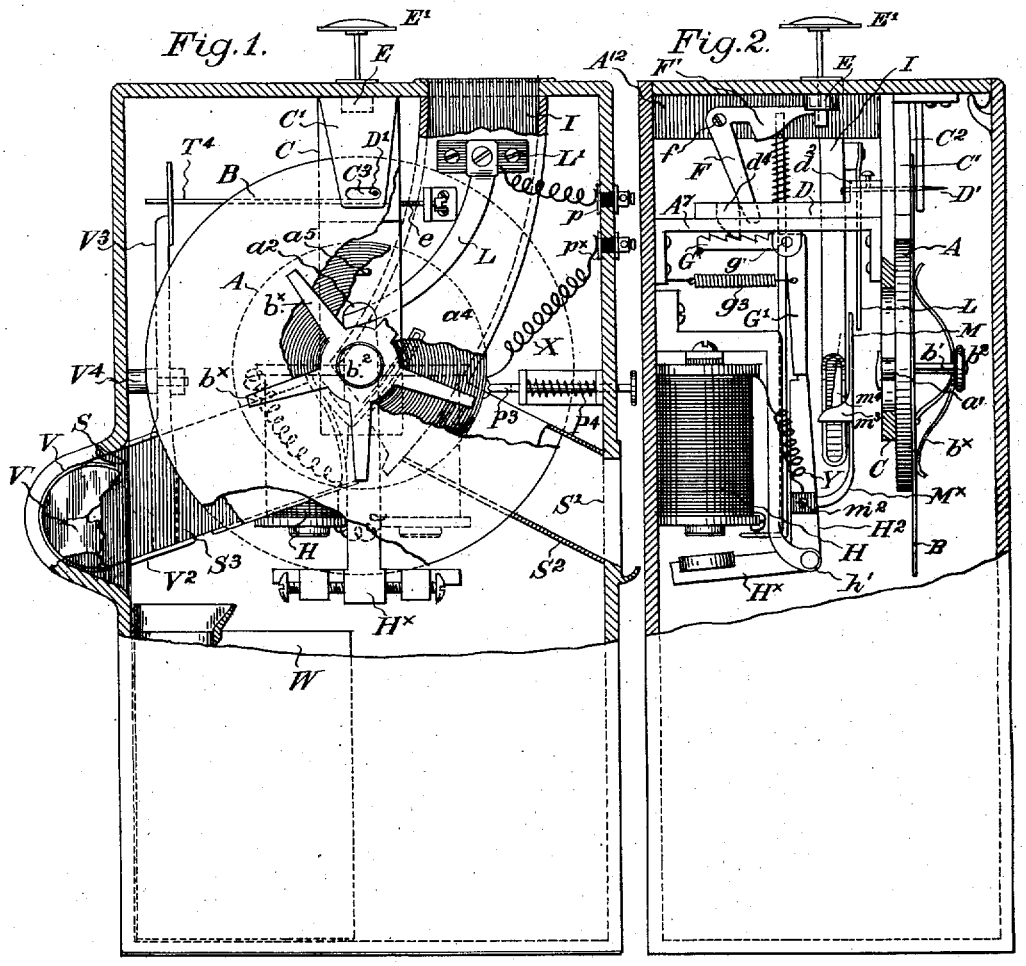
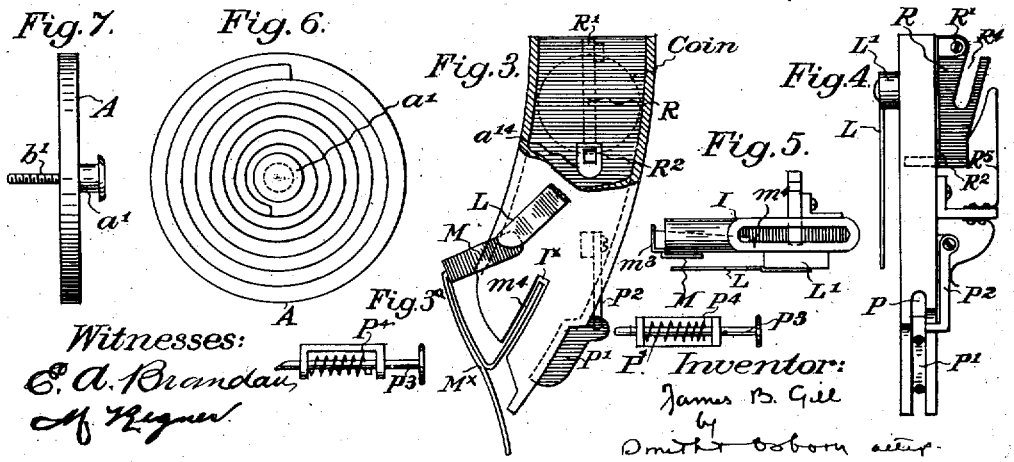
Witnesses:
E. A. Brandau
M. Regner
Inventor:
James B. Gill
by
Smith Osborn Atty.

No. 12,015. Reissued July 22, 1902.

J. B. GILL.

TOLL COLLECTING AND CALL RECORDING DEVICE FOR TELEPHONE SYSTEMS.

(Application filed Sept. 6, 1900.)

2 Sheets—Sheet 2.

Witnesses:

S. A. Brandau

M. Regner

Inventor:

James B. Gill by

Smith & Osborn his attorneys

UNITED STATES PATENT OFFICE.

JAMES B. GILL, OF SAN FRANCISCO, CALIFORNIA.

TOLL-COLLECTING AND CALL-RECORDING DEVICE FOR TELEPHONE SYSTEMS.

SPECIFICATION forming part of Reissued Letters Patent No. 12,015, dated July 22, 1902.

Original No. 635,378, dated October 24, 1899. Application for reissue filed September 6, 1900. Serial No. 29,151.

*To all whom it may concern:*

Be it known that I, JAMES B. GILL, a citizen of the United States of America, residing in the city and county of San Francisco, in the State of California, have invented new and useful Improvements in Toll-Collecting and Call-Recording Devices for Telephone Systems, of which the following is a specification.

This invention relates to improvements in means or devices for collecting toll for switches or connections made between a subscriber's line and other lines in a telephone system and for providing a permanent record of the switches at the subscriber's telephone; and the said improvements comprise certain novel parts and combination of parts, as hereinafter described, and pointed out in the claims at the end of this specification.

The said improvements comprise, among others, recording mechanism of novel construction, consisting of a rotatable record-card, a marking device operating to make a permanent record-mark on the card, mechanism for setting the marking device and for projecting it against the record-card, and an electrically-controlled actuating means adapted to release the marking device for action; also, in combination with this recording mechanism a novel means for controlling the marking device electrically from a central station, whereby the device cannot operate until it is released by the operator; also, in novel means whereby the operation of the recording device is made dependent on the insertion of a coin of given value in the device; also, a novel means for rejecting and discharging a coin from the box when it differs in size or value from the standard of the coin with which the recording mechanism is constructed to operate; also, in novel means whereby the inserted coin is placed under the control of the operator in the central station to be discharged from the mechanism at will and deposited in the coin-receptacle; also, in novel means whereby the released coin is temporarily arrested and exposed to view for inspection on its way to the coin-receptacle.

The following description explains at length the nature of the said improvements and the manner of constructing, applying, and carrying out the same, reference being had to the accompanying drawings.

Figure 10:
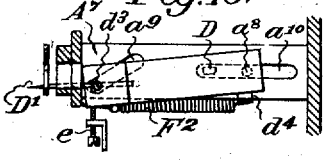
Figure 9:
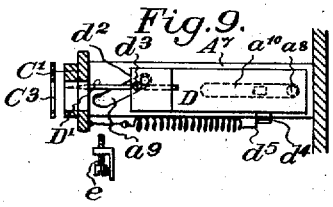
Figure 11:
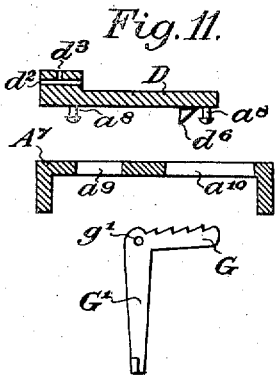
Figure 12:
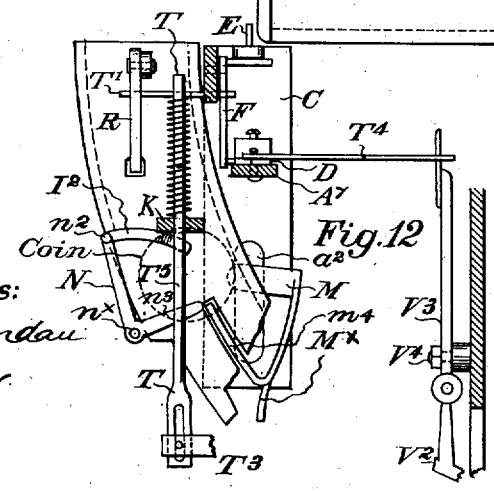

Figure 1 is a front elevation of a recording mechanism embodying the novel parts and features of the present invention, the front of the inclosing box being removed and portions of the record-card and parts of the mechanism being broken away and shown in section to expose parts in the rear. Fig. 2 is a side elevation taken from the left-hand side of Fig. 1. Fig. 3 is a detail view, in front elevation, of the coin-chute and parts of the electrically-controlled mechanism operated from the central station to drop the previously-inserted coin, the upper portion of the coin-chute being shown in section. Fig. $3^a$ is a top view in detail of the push-rod $P^6$. Fig. 4 is a detail view of the same parts, taken from the back of the coin-chute. Fig. 5 is a top view of Fig. 3. Fig. 6 is a back view of the rotatable disk. Fig. 7 is an edge view of the disk, Fig. 6. Fig. 8 is a side elevation of the device, taken from the right-hand side of Fig. 1, with the inclosing box partly broken away to expose the mechanism inside. Figs. 9 and 10 are top views in detail of the marking device in two portions, Fig. 9 showing it drawn back and set for operation, and Fig. 10 representing its position at the end of its forward throw after it has marked the card. Fig. 11 is a side view in detail of the slide, the stationary support, and the locking-lever of the marking device. Fig. 12 is a rear view of the coin-chute, illustrating a part or attachment that is combined for operation with the other mechanism to close the contact-springs in the circuit of the controlling-magnets when the deposited coin is not of proper weight to act on the springs.

A disk or wheel A, with a clamp $b^{\times}$ for securing to its front face a record-card B, is mounted for rotation on a central arbor or pivot $a'$, on which support it is free to turn in a vertical plane, and the pivot is also capable of a rectilinear movement in a plane coincident with the plane of rotation, so that if a pointer or marker be held against the card secured on the face of the disk while the disk is rotated a continuous spiral line will be described on the card by virtue of the aforesaid rectilinear and rotary movements of the disk. To produce these movements, the following mechanism is employed.

The pivot $a'$ is fitted to slide in a vertical slot $a^2$ in a bracket C, in which it is movable up and down, and in the back face of the disk is a spiral groove running from the circumference toward the center in a regularly-decreasing curve, in which a fixed stud or pin $a^5$, projecting from the front of the bracket above the slotted bearing, is fitted to work, so that the rotation of the disk on its pivot has the effect to produce an upward movement of the pivot in the slot, and by the combination of the two movements a spiral curve will be described on the face of the disk if a pointer be held in contact with it. A threaded spindle $b'$, with a nut $b^2$, furnishes the means for holding the clamp against the record-card B to cause it to turn with the disk.

C′ is a stationary block on the front of the bracket C, having a vertical slit $C^2$ to admit the rim of the card B and also a horizontal slot $C^3$, extending through the block and transversely across the slit $C^2$.

D is a slide-plate mounted on a stationary support formed of a bar $A^7$ and slidable thereon in a plane at right angles to the plane of rotation of the disk, the said plate being attached to the support by studs $a^8$ $a^8$, working in slots $a^9$ $a^{10}$ in the bar. A puncturing-needle D′ is clamped in a socket $d^2$ by a screw $d^3$, so as to extend into and project through the slot $C^3$ in the horizontal movements of the slide. These parts D D′ constitute a puncturing device by which a permanent record-mark is made on the card B every time the point of the needle is forced through the card. In addition to this function of puncturing the card the needle in each forward throw rotates the card-carrying disk and turns the same a fraction of a complete rotation, by virtue of which the punctures are spaced at regular intervals apart. This movement of the slide D is effected by setting the front guide-slot $a^9$ at an angle across the longitudinal line of reciprocation of the slide, so that the front end will move at an angle over and to one side of the longitudinal center line, while the rear end of the slide will swing on the stud $a^8$ as a center of motion in such forward throw of the slide.

Viewed from the front of the box the lateral movement of the puncturing device D takes place from right to left in the backward movement of the slide, but from left to right in the forward throw of the slide, and the effect of this as the needle is projected through the card is to rotate the disk a distance corresponding to the extent of lateral throw, and thereby space the record-marks made by the needle. This marking device thus performs the two functions of puncturing the card and of rotating it on its axis to space the holes.

E′ is a push-button on the outside of the box, having a stem with a head E on the lower end, and F is a bell-crank lever pivoted at $f$ to a stationary piece $A^{12}$ and connecting the push-button with the slide-plate D. The end of the horizontal member of this lever is offset laterally to bring it under the stem of the push-button, and the end of the perpendicular member rests against a shoulder or lug $d^4$. The slide is projected forward by a coiled spring $F^2$, attached to the slide at $d^5$ and to a fixed point in front, and a locking device holds the slide back ready for action. At the proper times to throw the marking device forward against the card the slide is released by mechanism actuated by the vibration of an armature operated through the medium of a relay in an electric circuit. The locking means to hold back the slide consists of the dog $d^6$ on the bottom of the slide-plate D engaging the notches of the ratchet G on an arm or member G′, depending perpendicularly from the pivot $g'$. A spring $g^3$ holds the ratchet up against the dog or projection on the slide.

H is an electromagnet, and $H^\times$ a vibrating armature-lever pivoted at $h'$ and having a perpendicular member $H^2$ extending upward behind the tripping-arm G′ in such relation thereto that in the movement of the armature under the attraction by the magnet the lever $H^2$ will strike the tripping-arm and release the dog $d^6$ from the ratchet G. The magnet H is connected into the main circuit of the line, so as to be under the control of the operator at the central station to be energized at will. At the subscriber's telephone the circuit stands normally open and is closed by inserting the coin in the chute, so that the recording mechanism is allowed to act only at the will of the operator in the main office, and, on the other hand, the relay cannot be energized until the coin has been inserted. This controlling means is composed of two circuit-closing springs L M, interposed in the circuit of the magnet and located between the inlet end of the coin-chute and its outlet end in such position with respect to the coin-passage that one spring will be pressed against the other by the descending coin, and the circuit will be closed in the movement of the coin through the chute. The construction and operation of this controlling mechanism will be understood from the detail views Figs. 2, 3, 5, and 8. The contact L is a spring-tongue on the front of the chute I, insulated from it by a block L′ and with its free end extending across the other contact M, which is secured to an extension $M^\times$ on the upright member $H^2$ of the armature-lever $H^\times$. The part $M^\times$ is insulated at $m^2$ and has an inclined or wedge-shaped edge $m^4$ setting through a slot $I^\times$ in the front side of the chute I and into the coin-passage, so that the descending coin striking this incline will press out the spring M and bring the same in electrical contact with the spring L. The same member $M^\times$ has a lip or projection $m^3$ standing across the throat of the coin-passage below the incline or between that point and the coin-receptacle in such position that it will hold back the coin in the chute until the armature is attracted and the lever $H^2$ is moved. The piece $M^\times$ thus acts to close the circuit at L M, so that the magnet may be energized, and the gate $m^3$ on the same piece retains the coin in the passage until the armature-lever draws the gate away from the passage and allows the coin to roll into the conductor or receptacle provided to catch it. The circuit through the magnet is carried from a post $p$ to one contact L and from the post $p^{\times}$ to the magnet by a wire $x$ and from the windings of the magnet to the contact M by a wire $y$, so that the circuit is open at the two points L M. The circuit, being connected into the local-battery circuit of the telephone, is arranged to be energized by cutting out the resistance of the subscriber's line, which is done at the central station in the usual manner by means of the operator's switch; but until this takes place the magnet H is inactive and the inserted coin is retained in the chute, and the recording mechanism is also under the control of the operator in the main office or station to the extent of being held out of action after being set and of operating only when its magnet is energized. Thus the device will operate only after the required coin has been deposited, because the circuit remains open at L M until the coin is inserted.

In connection with this mechanism there is provided a coin-discharging mechanism, through the medium of which coins differing in size or value from the standard coin required to be used in the device can be diverted from the coin-passage through the chute and discharged to the outside of the box instead of being dropped and retained in the box. This means consists of an aperture P in the back of the chute I of proper size to let a coin drop through, and a gate P′, fitted to control that opening and to be drawn away from it by a push-rod $P^3$, operated from the outside of the box and having a beveled or wedge-shaped end setting in line with the rear face of the gate P′, so that the longitudinal movement of the rod bringing this inclined face against the gate will force that part back away from the outlet-slit in the chute.

The gate P′ is attached to the side of the chute by a hinged lever $P^2$, that brings the gate to place after it has been moved back to discharge the coin, and the operating-rod $P^3$ is returned to position by a coiled spring $P^4$.

A trough or conductor $S^2$, extending from the aperture in the back of the chute to a slit S′ in the side of the box, discharges the coin outside when the gate is opened. Through this outlet a coin of smaller denomination, if accidentally inserted, can be recovered from the box instead of being deposited in the receptacle with the other coins, and as the mechanism is adjusted to operate only with a coin of a given size the inserted coin can be discharged to the outside of the box through the opening P at any time instead of being deposited in the receptacle inside.

To insure the coin being deposited in the box and the push-button E′ being released before the record is made on the card, a cut-off R, working through a slot in the back of the chute and across the coin-passage, is connected with the push-button E′, so as to be drawn back clear of the passage when that button is pressed, but to return to place across the passage as soon as the button is released. This cut off, as shown in the detail views Figs. 3 and 4, consists of the pivoted latch R, attached by a loose joint R′ to the back of chute and having a lower end $R^2$ at right angles to the arm R, working through an opening $a^{14}$ in the chute, so as to extend into and lie across the coin-passage. In the upper part of the latch is an inclined slot $R^4$ to take a cross-pin T′, that is fixed in an upright rod T, working in a guide K in the box behind the coin-chute. One end of the ross-pin rests in the inclined slot of the latch, while the other extends under the support of the lever F and projects in the path of an incline or projection F′ on the horizontal arm of the lever F. Thus the push-button while acting upon the lever F to set the slide D also draws the latch back from the coin-passage at the same moment, and the latch is thrown forward to place by the spring $R^5$ after the pressure is taken off the push-button.

The rod T terminates in a foot $T^3$, that is adapted to strike and move the relay when pressure is applied to the rod from above, and a coiled spring $T^2$ returns the rod to position, releasing both the armature and the latch R as soon as the pressure is removed from the push-button. The rod thus performs the two functions of operating the latch to drop the coin and of forcing the armature away from the poles of the relay in case it may be held up to it by the residual magnetism at the end of the operation. Also by holding back the armature until the pressure is removed from the push-button this rod T prevents the operator in the central office from energizing the relay, and thereby releasing the recording device for operation, before the coin has been dropped into the coin-chute.

Provision is made for exposing to view the coin last deposited by arranging on the outside of the box a coin-pocket V, with a glass front V′, and connecting the outlet end of the coin-chute I with this pocket by an inclined trough or conductor S, from which the coins are discharged through an opening $S^8$ in the bottom of the trough, where it joins the pocket V, and are dropped into a receptacle W provided for them in the lower part of the box. This outlet is controlled by a swinging gate $V^2$, operated in one direction by gravity to close the opening and retain the coin in the pocket and set away from the opening by the movement of the armature lever under the attraction of the magnet. For this purpose the gate is connected with or into the lever by an arm $T^4$, projecting laterally from the needle-carrying slide and rigidly attached to that part, and an upright lever $V^3$, pivotally attached to the side of the box and carrying on its lower member the gate $V^2$. The upper member of this lever above the pivot $V^4$ stands behind and in the path of the arm $T^4$, so that the movement on its pivot has the effect to draw the gate back and uncover the aperture $S^3$, and this movement takes place each time in the setting movement of the slide D and somewhat in advance of the progress of the coin through the chute and down the inclined trough. The previously-deposited coin already lodged in this pocket V is caused to drop through the aperture $S^3$ in the trough, and the gate is returned to place to close the opening before the last-deposited coin reaches the opening, so that one coin is discharged from the pocket before the next one is lodged in it for inspection. The pocket is provided with an inclined bottom pitching in the opposite direction to the trough, so as to discharge the coin at the moment the gate is moved away from the outlet and allow the gate to close again for the next descending coin to pass over the gate and enter the pocket. This construction has the advantage of affording a clear view of every coin before it is finally deposited in the receptacle provided in the box.

The device thus constructed is attached for operation to the battery of the subscriber's telephone or in position where it can be connected and operated conveniently, and the magnet H being properly connected into the local circuit the operation of the mechanism proceeds as follows: After the coin is inserted in the box and the push-button is pressed down and released the coin drops into the lower part of the chute, where by contact with the wedge $m^4$ it throws the spring M against the spring L. The same movement of the push-button sets back the slide D ready for action, and the magnet-circuit being closed at L M by the coin the lever G′ will trip the ratchet that holds back the slide as soon as the operator at the central office throws the battery on the magnet H. By that operation the needle is projected against the record-card and a permanent record is made thereon. In this movement the lateral throw of the slide D causes the disk B to turn on its center a short distance, according to the length of the lateral throw made by the needle. At the time of each punctuation, therefore, the disk is turned a fraction of a complete rotation on its axis. When the push-button E′ is pressed down again, the slide is drawn back and set for the next operation. In that movement the needle is withdrawn from the card without turning it, as the amount of penetration is only sufficient to cause the needle to engage the card sufficiently to turn it, and the resistance of the fixed pin that engages the spiral is sufficient to hold the card from being turned back by the retraction of the needle.

A relatively small disk can be made to contain a considerable number of record-marks by giving the disk an upward movement in a vertical plane in addition to its rotative movement, as already described, so that the line of punctures made by the needle will run in a continuous spiral line, beginning at the circumference and decreasing in size as it runs toward the center. In this operation also the necessary coin to pay for the switch is retained in the chute until the operator is ready to give the required connection with the other subscriber and is released by the movement of the armature-lever that is connected with the recording device.

Provision is made for insuring the proper movement of the incline $m^4$ in the case of a coin of light weight that is not sufficiently heavy to act properly on the incline. In such case a lever N, attached to the back of the chute on a pivot $n^\times$, is provided with an upright member, in the end of which is a pin $n^2$, sitting horizontally across and extending through a slot $I^2$ in the coin-chute, so as to lie across the coin-passage, and with an angular member $n^3$, projecting in the path of a pin $T^5$ in the push-rod T. In the downward movement of the rod the stop $T^5$, engaging this end of the lever, will throw the opposite end in the slot $I^2$ against the edge of the coin lying in the coin-passage with a sufficient degree of pressure from above to press the coin against the incline $m^4$, and thereby force the same outward. This attachment is designed to be used only in cases where coins of light weight may be dropped in the box, and under all other conditions it may be dispensed with.

Having thus fully described my invention, what I claim as new therein, and desire to secure by Letters Patent, is—

1. A recording mechanism including a rotatable record-card, a marking device, means projecting said marking device against the face of the card, means for moving the card to space the markings, means for setting and locking the marking device for action, and means for releasing the marking device at will to impinge against the card.

2. A recording mechanism including a rotatable record-card, a marking device movable in a plane perpendicular to the face of said card, means for projecting the marking device against the card, means for setting and locking the marking device for such movement, means for releasing the marking device, and means for simultaneously rotating the card with the marking thereof.

3. A recording mechanism including a rotatable record-card, a marking device movable in a plane perpendicular to the face of the card, means for projecting the marking device against the card, means for drawing back and setting the marking device for such movement, means rotating said card and simultaneously imparting rectilinear movement thereto in a plane coincident with the plane of its rotation to space the markings, and a releasing device to set free the marking device.

4. The combination of a rotatable record-card, means for imparting a combined rotative movement and rectilinear movement in a plane coincident with the plane of rotation, a marking device operating in a plane perpendicular to the face of the record-card, means for drawing back and projecting said marking device against the face of the card, and means for locking and tripping the said marking device.

5. The rotatable disk having its center of rotation adapted to move in a right line coincident with the plane of rotation and having a spiral groove in one face, a fixed pin engaging said spiral, and means for imparting rotative movement to the disk; in combination with a marking device operating in a plane perpendicular to the face of the disk and adapted to impinge against the face thereof, whereby the movements of the marking device are recorded in a continuous spiral line on the disk, means for drawing back and setting the marking device for such movement, and a releasing device to set free the marking device.

6. A recording mechanism including a rotatable record-card, a marking device movable in a plane perpendicular to the face of the record-card, means for projecting the marking device against the record-card, means whereby the marking device will rotate the card to space the markings, means for setting and locking the marking device for said movement against the card, a releasing device, and means for operating the releasing device consisting of a relay in an open circuit in which is included a circuit-closing device and an armature adapted by its vibrations when the relay is energized to operate the releasing device.

7. In a recording mechanism a rotatable disk, a clamping device adapted to hold a record-card on the disk, a puncturing device, means for projecting the puncturing device against the card and means for moving the puncturing device laterally during its penetration of the card, to rotate the latter, means for drawing back and setting the marking device for such movement, and a releasing device.

8. In a recording mechanism, a rotatable record-card, means for moving said card in a plane coincident with the plane of rotation and simultaneous with such rotation, a puncturing device movable at right angles to the card, means for projecting the puncturing device against the face of the card, means for imparting lateral movement to the puncturing device during its penetration of the card, means for drawing back and setting the marking device for such movement, and a releasing device.

9. A recording mechanism including a record-card mounted for rotation on an axis, a punctuating device having a movement perpendicular to the face of the card to engage the card, and a lateral movement to rotate the card, means for setting and locking the marking device for such movement, and means for releasing the marking device.

10. The combination of a rotatable record-card, a punctuating device operating in a plane perpendicular to the face of the record-card, means for drawing back and locking the marking device, means for releasing and projecting said marking device against the face of the card, and means for moving the puncturing device laterally during its penetration of the card to rotate the latter.

11. A coin-controlled recording mechanism for telephone systems, including a record-card, a marking device, means projecting the marking device against the face of the card, means for moving the card to space the markings thereon, means for setting and locking the marking device for action, and coin-controlled means whereby the marking device is released by a current from the central station at the will of the operator.

12. A coin-controlled recording mechanism for telephone systems, including a record-card, a marking device, means projecting said marking device against the face of the card, means for moving the card to space the markings thereon, means for setting and locking said marking device for action, means whereby the marking device is released by a current from the line-circuit, and coin-controlled means whereby the circuit normally open at the recording mechanism is restored by the inserted coin.

13. A coin-controlled recording mechanism, including a rotatable record-card, a marking device movable in a plane perpendicular to the face of the card, means projecting the marking device against the card, means for moving back and locking the marking device in position for action, means for rotating the card, and coin-controlled means whereby the marking device is released by a current from the central station.

14. A recording mechanism, including a rotatable record-card, a marking device movable in a plane perpendicular to the card, means for projecting the marking device against the record-card, means for setting the marking device for said movement, an electrically-controlled releasing device in an open circuit in which is included a circuit-closing device, and coin-controlled means for closing said circuit to operate the releasing device.

15. A recording mechanism including a rotatable record-card, a marking device movable in a plane perpendicular to the card, means for projecting said marking device against the face of the card, means for imparting lateral movement to the marking device in its forward throw at the time of its contact with the card to turn the card on its center of rotation, means for drawing back and setting the marking device, a releasing device and means for operating said releasing device adapted to be set in operative condition by the insertion of a coin therein.

16. In a coin-controlled recording mechanism the combination, with a rotatable record-card, reciprocating marking device, means for projecting the same against the face of the card, a push-button and means connecting the same with the marking device to draw back and set the latter for operation, a coin-controlled releasing device adapted to release the operative means that projects the marking device against the record-card, and means for imparting limited rotative movement to the record-card at each operation of the marking device.

17. The combination of the rotatable disk, means for attaching a record-card thereto, a marking device operating in a plane perpendicular to the record-card to impinge against the face thereof, means for drawing back and setting the marking device for operation, means for projecting the latter against the card, a releasing means consisting of a locking-lever, an electromagnet in an open circuit in which are included circuit-closing contacts, an armature adapted by the attraction of the magnet to trip the locking-lever and release the marking device, means for closing said magnet-circuit comprising a coin-chute, a device interposed in the path of the coin by engagement therewith to close the electrical contacts in the magnet-circuit, and means for energizing the magnet at will after the circuit thereof is closed by the coin.

18. In a coin-controlled mechanism the combination with the coin-chute I, of the push-rod T, push-button E′, means connecting the latter with the rod, and the lever N having one arm engaging a pin on the push-rod and another arm adapted to work through a slot in the back of the coin-chute and to engage the edge of the deposited coin from above.

JAMES B. GILL.

Witnesses:
EDWARD E. OSBORN,
M. REGNER.